April 15, 1969
N. C. WILLIAMS ET AL
3,438,607
VALVE FOR EVACUATOR
Filed March 28, 1966
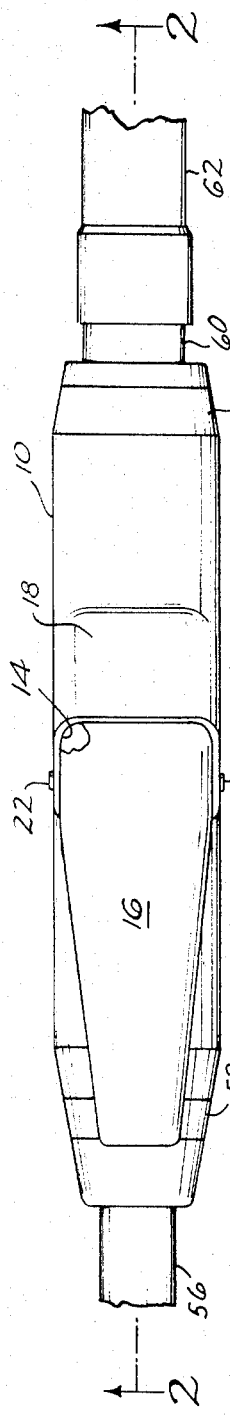
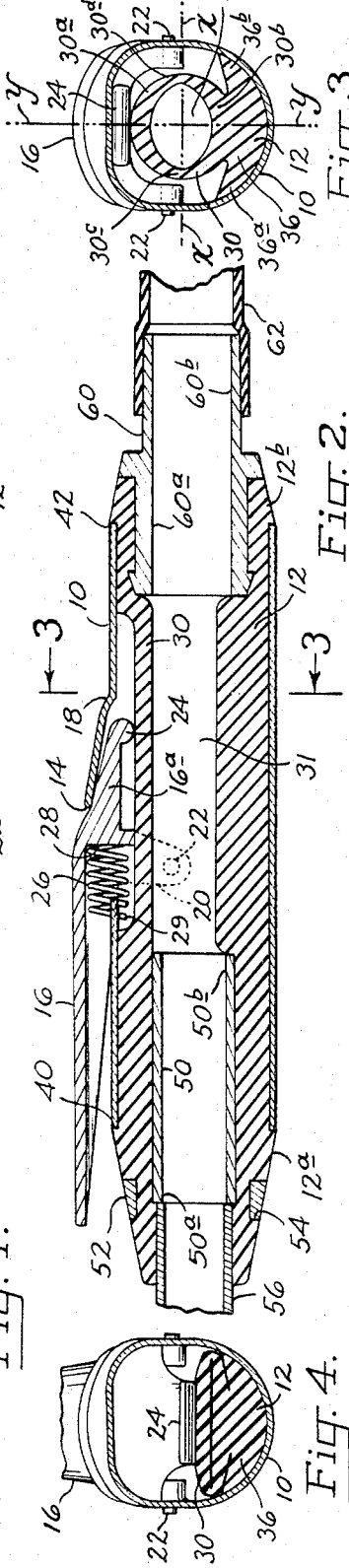
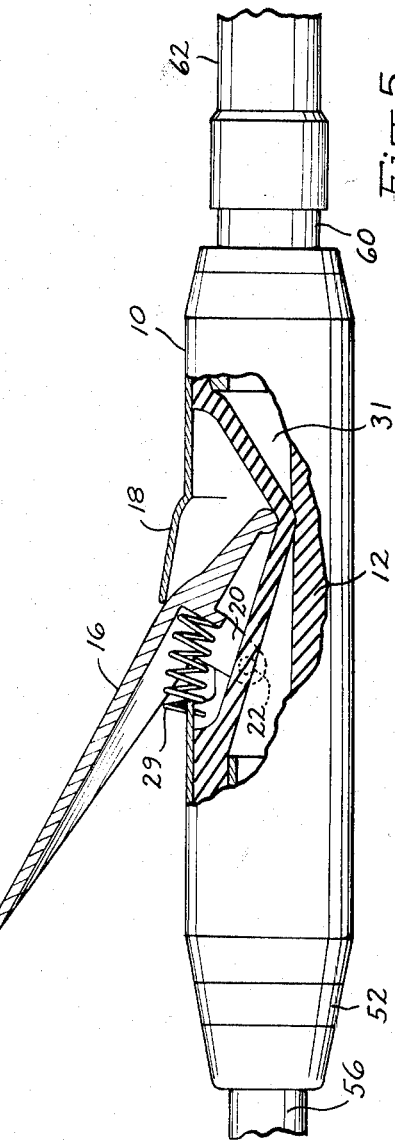
Norman C. Williams
Dwight A. Booth
INVENTORS
BY Kolisch & Hartwell
Attys.

3,438,607
VALVE FOR EVACUATOR

Norman C. Williams and Dwight A. Booth, Portland, Oreg., assignors, by mesne assignments, to Omark Air Controls, Inc., Portland, Oreg., a corporation of Oregon
Filed Mar. 28, 1966, Ser. No. 537,992
Int. Cl. F16l 55/14; F16k 7/06
U.S. Cl. 251—9        4 Claims

ABSTRACT OF THE DISCLOSURE

A valve including an elongated hollow element having a flexible sleeve section between its ends formed by a tubular wall which defines an open throat with the sleeve section relaxed. The sleeve section has a generally ovate cross section, and the valve has means for flattening opposed sides of the sleeve section against the major axis of such cross section. Side regions of the sleeve section located circumferentially from said opposed sides move against the side expanses of a backing integral with the sleeve section, to be supported by said side expanses on compressing of the sleeve section.

---

This invention relates to a valve, and more particularly to a valve for controlling fluid flow wherein sides of a sleeve comprised of rubber or other elastomeric material are compressed together to effect closing of the valve.

The particular and preferred embodiment of the invention herein illustrated relates to a valve such as might be used to control the application of a vacuum to a mouth evacuator or other form of vacuum operated dental instrument. The interior of the valve is readily cleaned with a brush or other device passed through the valve, and when open accommodates the flow of a relatively large volume of material through the valve with negligible resistance offered to such flow. These considerations have made the valve of particular utility for controlling the application of vacuum to a dental evacuator, and thus the description of the invention in such an organization. By describing the invention in connection with dental equipmet, however, it is not intended necessarily to be limited to such a particular use, as certain concepts of the invention have broad application.

According to this invention, a valve is contemplated comprising an elongated hollow element of rubber, or other elastomeric material, having a sleeve or sleeve portion intermediate the ends of the element with a tubular wall defining an open throat with the sleeve portion relaxed. A shiftable clamp bears against one side of the sleeve portion to compress the same, whereby such throat is closed off. A feature and object of the invention is to provide, in such an organization, a novel backing for the sleeve portion which promotes tight closing of the valve on compression of the sleeve portion to bring its sides together.

Yet another and related object of the invention is to provide a backing which is of elastomeric material, and forms an integral part of the sleeve. The backing extends in expanses located laterally outwardly of the sleeve, and on the sleeve being compressed to effect closing of the valve, the backing resiliently supports side regions of the sleeve formerly out of contact with the backing.

Another object is to provide a novel construction for the sleeve in such a valve, constructed so that stresses in the sleeve with the valve closed are minimized. As a consequence, repeated operation is possible without tearing and rupturing in the material forming the sleeve. Specifically, this invention contemplates an ovate cross-sectional outline for the sleeve when the same is relaxed, with side regions of the sleeve along the major axis of such ovate outline having reduced thickness in comparison with sides of the sleeve along the minor axis of such outline.

Yet a further object is to provide a novel valve, including a substantially cylindrical housing, which provides support for and encompasses the elongated hollow element discussed. This housing may provide a mounting for a pivoted clamp used in effectuating closing of the valve.

Another object is to provide, in such a valve, including a housing as described, stiff liners which extend within the hollow element serving to hold the element snugly against the inside of the housing and imparting stiffness to the element in the completed valve.

Yet another object is to provide such a valve wherein the hollow element adjacent one end of the housing protrudes outwardly from the housing, and the liner adjacent this end of the element has its outer end spaced inwardly somewhat from the outer end of the element. In this organization the outer end of the element may form a resilient seat for a tube or other device inserted therewithin.

These and other objects and advantages are attained by the invention, and the same is described hereinbelow in conjunction with the accompanying drawings wherein:

FIG. 1 is a view of a valve constructed according to one embodiment of the invention, showing a substantially cylindrical housing for the valve and a pivoted clamp mounted thereon;

FIG. 2 is a cross-sectional view, taken generally along the line 2—2 in FIG. 1, and illustrating in more detail an elongated hollow element of elastomeric material mounted within a housing in the valve;

FIGS. 3 and 4 are cross-sectional views, taken generally along the line 3—3 in FIG. 2, illustrating the valve open and closed, respectively; and FIG. 5 is a view, partially in section, showing the valve in FIGS. 1 and 2, with the valve closed.

Referring now to the drawings, and more particularly to FIG. 1, the valve illustrated comprises an elongated substantially cylindrical housing 10 which may be made of a rigid material, such as metal or a stiff plastic. The housing surrounds and supports an elongated hollow element 12 of elastomeric material, such as rubber, which extends longitudinally within the housing. It will be noted that in the embodiment illustrated sleeve 12 has end portions 12a, 12b, which extend some distance beyond the ends of the housing.

Housing 10 intermediate the ends thereof has an opening 14 provided on one side. This opening is to accommodate end 16a of a clamp 16, which end of the clamp extends through the opening to a point adjacent the outside of element 12. To the right of opening 14 in FIGS. 1 and 2, housing 10 includes a flared skirt portion 18 introducing a degree of clearance between the inside of the housing and the outside of element 12 in that region of the housing containing end 16a of the clamp. The clamp is pivotally mounted on the housing, through depending ears such as the one shown at 20 integral with the clamp and on either side of the housing, and pins 22 pivotally interconnecting these ears with adjacent regions of the housing.

As can best be seen in FIGS. 2 and 3, the clamp includes a transversely extending rib 24 at the farthest extremity of end 16a, which is integral with the clamp. This rib overlies element 12, and as will become apparent below, functions to compress the element to close the valve with the handle pivoted in a clockwise direction from the position shown in FIG. 2 to the position shown in FIG. 5. Biasing the handle in such clockwise direction about the pivot axis provided by pins 22 is a coil compression spring 26, with one end seated on a ledge 28 forming part of the handle, and the other end seated on the housing, at 29.

Considering now in more detail the construction of hollow element 12, intermediate its ends the element includes a sleeve or sleeve portion designated at 30. The sleeve portion has a tubular wall defining an open throat 31 in the valve with the sleeve portion in a relaxed state as illustrated in FIG. 3. The sleeve portion of the hollow element, as best seen in FIG. 3, is generally of ovate cross-sectional outline. Along the major axis of this ovate outline, shown at x—x in FIG. 3, side regions of the sleeve have relatively narrow thickness. Along the minor axis, shown at y—y, the walls of the sleeve portion have considerably greater thickness.

As can be seen with reference to FIG. 4, which shows how the sleeve looks with the valve closed, relatively thick upper and lower sides 30a, 30b of the sleeve tend to inhibit excessive flexing of regions with the valve closed. However, relatively thin side regions of the sleeve 30c, 30d disposed between the relatively thick upper and lower sides accommodate flexing of these side regions in a tight angle whereby the valve may be completely closed on compressing of the sleeve. This closing of the valve is permitted with minimum stretching of the outer surfaces of regions 30c, 30d of the sleeve and minimum compression of inner surfaces of these regions. Were the sleeve to comprise a wall having the same thickness throughout, difficulties would be encountered in closing the valve completely. Further, stresses would be introduced into the sides such as would soon result in cracking and rupture, and material shortening of the life of the assembly.

According to this invention, a backing portion 36 is also provided, of elastomeric material, which in the embodiment of the invention illustrated is an integral part of element 12 at the location of the sleeve. The backing extends in expanses 36a, 36b located laterally outwardly of top and bottom sides of the sleeve. These expanses are out of contact with side regions 30c and 30d of the sleeve, which side regions are circumferentially spaced from top and bottom sides 30a and 30b. The function of these backing expanses is to form a resilient backing for regions 30c, 30d upon such being flexed to close the valve. As a result, tighter closing is possible. Further, with valve closed, in cross section the outline of the sleeve still retains an ovate shape to a degree, as best seen in FIG. 4, which is the shape it should assume by reason of the thicker walls at top and bottom sides of the sleeve.

The valve is assembled by inserting hollow element 12 through housing 10 with the rubber in the walls of the element distorting somewhat to accommodate its passage through the housing. Ends 12a, 12b of the sleeve are somewhat tapered, as best seen in FIG. 2. Directly adjacent the ends of the housing, shoulders 40, 42 are formed, which abut against the ends of the housing and serve to keep the element from axially shifting relative to the housing.

In completing the valve assembly, a liner 50 of metal or other stiff material, substantially cylindrical in shape, is inserted into the passage which extends along the inside of the element adjacent the left end of the housing in FIG. 2. This liner has its outer end, shown at 50a, spaced somewhat inwardly from the adjacent outer end of element 12. Its inner end 50b is located within a region bounded by the housing. The liner is snugly received within element 12, and being of stiff material, shapes the left end of the element whereby the outside of the element fits snugly against the inside of the housing. Thus, the liner adds stiffness to the valve adjacent the left end of the assembly in FIG. 2. To stiffen the assembly further, a ring 52 is shown, of metal or other stiff material, which seats within an annular groove 54 extending around the left protruding end of the element 12 in FIG. 2.

The exposed end 12a may be employed to seat the end of a tube or other conduit connecting the valve assembly with an evacuator supplied with a vacuum through the assembly. Thus, in FIG. 2 such a tube is shown at 56. The tube has its outer surface effectively sealed to the inside of element 12.

Another stiff liner, shown at 60, may be provided in the opposite end of element 12. This liner includes an inner end 60a fitted within end 12b of the hollow element. The outer end of the liner, shown at 60b, may be employed for fitting a hose thereabout for the supply of vacuum to the valve, such a hose being shown at 62. The inner end of the liner, extending as it does within element 12 where such element is lodged within the housing, also serves to add stiffness in this region of the assembly. The two liners have internal passages which communicate with throat 31, and thus a passage is provided extending entirely through the valve assembly.

The operation of the valve should be apparent from the above description. With a vacuum supplied to hose 62, and the clamp released, spring 26 operates to swing the clamp in a clockwise direction from the position shown in FIG. 2, to place the clamp in a closing position as shown in FIG. 5. The pressure of the spring, together with atmospheric pressure on the outside of sleeve 30, causes side 30a to move against side 30c, with closing of the valve as shown in FIG. 4. Closing is completely tight, with minimum stressing of the walls of the sleeve, by reason of sleeve's cross-sectional shape, the presence of the backing, and the differences in wall thickness earlier described. When an operator wishes to supply vacuum from the hose to tube 56, the clamp is gripped and swung in a counterclockwise direction from the position shown in FIG. 5, to shift it into a position substantially parallel to the housing, as shown in FIG. 2. The walls of the sleeve having some resiliency, and upper side 30a being stretched somewhat with the valve closed, on such movement of the clamp, side 30a straightens, as shown in FIG. 2, whereby, a fully opened passage is established between hose 62 and tube 56 capable of handling a relatively large volume of material.

Cleaning of the valve is readily performed. With tube 56 and hose 62 removed from the valve, a relatively large diameter passage extending substantially straight through the valve is presented which may be cleaned by passing a bottle brush or other instrumentality through the center of the valve. The valve, because of the open throat in the interior thereof with the sleeve relaxed, is highly resistant to clogging.

While an embodiment of the invention has been described, it should be obvious that variations are possible without departing from the invention. It is desired therefore to cover all such modifications and alternative constructions as would suggest themselves to those skilled in the art, and that come within the scope of the appended claims.

We claim:

1. In a valve, a flexible sleeve of elastomeric material with a tubular wall defining an open throat with the sleeve relaxed:
   a movable clamp shiftable to bear against one side of said sleeve to compress the same, whereby said throat of said sleeve is closed off, and
   a backing for said sleeve of elastomeric material integral with the sleeve, said backing being spaced circumferentially from said one side of the sleeve and out of contact with side regions of the sleeve disposed between said backing and said one side of the sleeve with the sleeve relaxed, said backing being disposed radially outwardly of said side regions with the sleeve relaxed and engageable with the exterior surfaces of said side regions to support said side regions of the sleeve after initial flexing of the side regions on compressing of the sleeve by said clamp.

2. In a valve, a flexible sleeve of elastomeric material with a tubular wall defining an open throat with the sleeve relaxed:
  a movable clamp shiftable to bear against one side of said sleeve to compress the same, whereby the throat of said sleeve is closed off, and
  an elastomeric backing for the sleeve joined in a midregion of the backing to the sleeve along the side of the sleeve opposite the sleeve's one side, said backing including side expanses on either side of said midregion which are out of contact and disposed radially outwardly of side regions of the sleeve spaced circumferentially from the sleeve's said one side, said side expanses of the backing being engageable with the exterior surfaces of said side regions of the sleeve to support said side regions of the sleeve after flexing of said side regions by compressing of the sleeve by said clamp.

3. The valve of claim 2 where the tubular wall of said sleeve has a generally ovate cross-sectional outline, with the minor axis of such ovate cross-sectional outline extending diametrically from said one to said opposite side of the sleeve and the major axis of such outline extending normally of the minor axis.

4. The valve of claim 3, wherein the tubular wall of the sleeve has an increasingly greater thickness progressing in opposite circumferential directions from where such wall is intersected by the major axis of the sleeve's cross-sectional outline.

References Cited

UNITED STATES PATENTS

| 599,383 | 2/1898 | Bunnell et al. | 251—9 XR |
| 2,371,434 | 3/1945 | Eppler | 251—7 XR |
| 2,575,240 | 11/1951 | Thompson | 251—5 XR |

FOREIGN PATENTS

| 582,032 | 11/1946 | Great Britain. |
| 93,511 | 3/1959 | Norway. |
| 268,933 | 9/1950 | Switzerland. |

ALAN COHAN, *Primary Examiner.*

RICHARD GERARD, *Assistant Examiner.*